Dec. 28, 1937.   R. ECKARDT   2,103,351
METALWORKING MACHINE
Filed Sept. 13, 1935   3 Sheets-Sheet 2

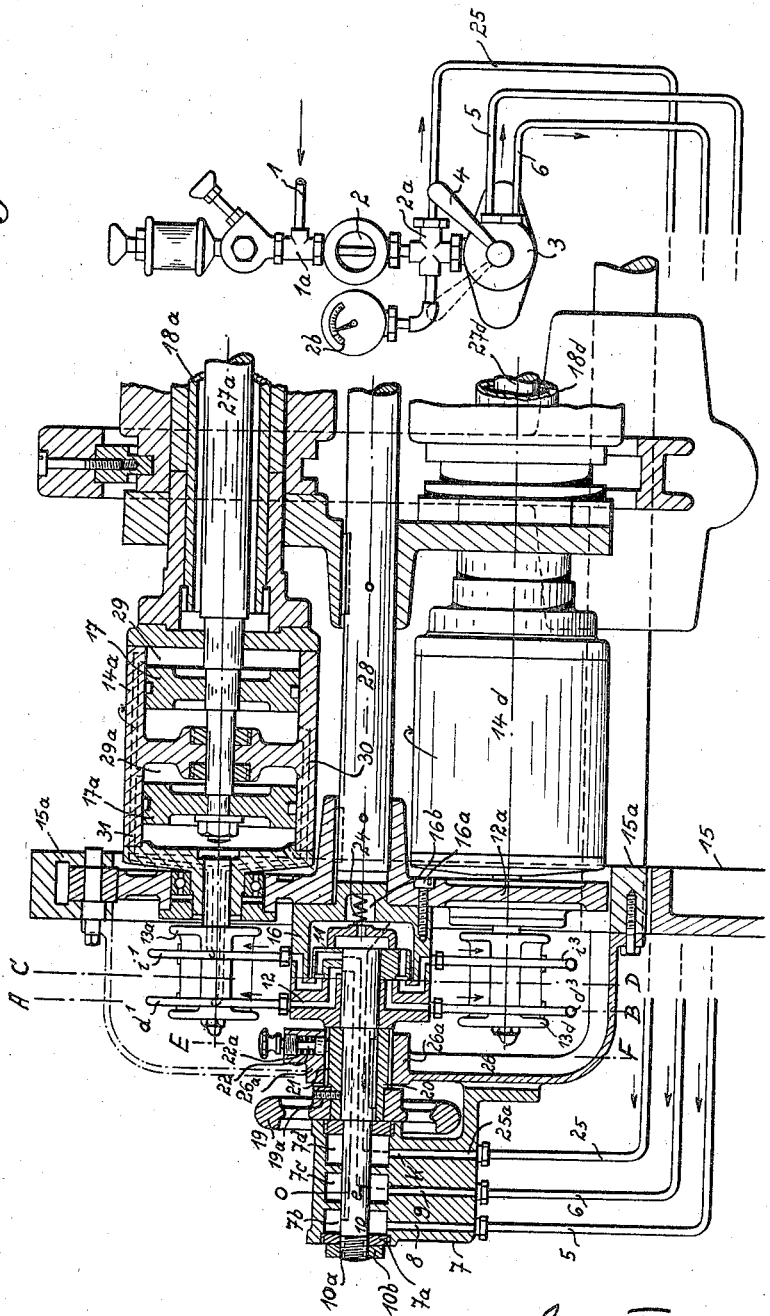

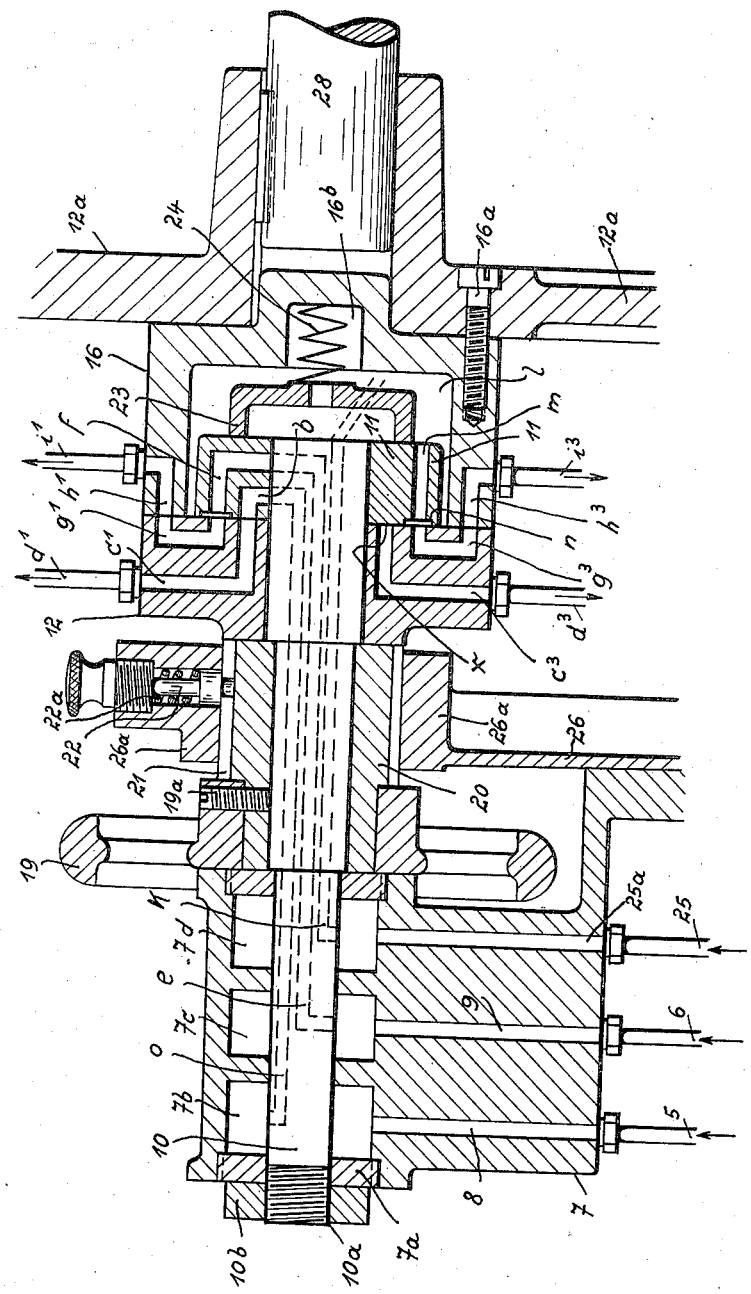

Patented Dec. 28, 1937

2,103,351

UNITED STATES PATENT OFFICE 2,103,351

METALWORKING MACHINE

Rudolf Eckardt, Leipzig, Germany, assignor to The National Acme Company, Cleveland, Ohio, a corporation of Ohio Application September 13, 1935, Serial No. 40,403
In Germany September 17, 1934

28 Claims. (Cl. 29—38)

The present invention relates to improvements in metal working machines and more particularly in automatic machine tools having a plurality of work spindles. The invention especially relates to a pressure fluid operated control device for the collets or chucks of a multiple-spindle metal working machine and is to provide for a simplified and improved control device of the several work spindles.

So far, the several pneumatic devices connected to the ends of the work spindles were controlled individually for each chucking appliance so that e. g. in the case of an automatic or semi-automatic with four work spindles also four control devices were used which were actuated individually when the spindle carrier was to be indexed, or were actuated from a control arranged in the extension of the spindle carrier-indexing axis, said control having a cylindrical tightening between the supplying rotary piston and the distributing members to the single pressure cylinders. Such cylindrical tightening surfaces which revolve when controlled may be utilized if liquids, such as oil etc. are used as driving means, but never when compressed air is used.

According to the invention the pneumatic or pressure fluid operated devices applied to a multiple-spindle metal working machine are actuated by means of a single central control mechanism.

According to the invention the said control is effected centrally to the indexing axis of the spindle carrier by means of central distributing discs arranged between the pneumatic devices, particularly the compressed-air cylinders, of a multiple-spindle metal working machine, in which movement of the distributing discs controlling the adjusting of the supplying ducts to one another takes place at the plan surfaces of the distributing members.

According to the invention this central control device can be so adjusted by a special indexing mechanism relatively to each compressed-air cylinder of each work spindle that the chucking device of each work spindle can be opened and closed respectively by the action of the compressed air in any position of the spindle carrier.

According to the invention the collets or chucks of the other spindles are kept under pressure while the one work spindle referred to is being controlled. According to the invention this effect is obtained by means of a pressure chamber disposed behind the plan faces of the distributing disc and supplied by a special conduit. The side not subject to pressure of the cylinder space is however connected to the atmosphere by ports provided for in the distribution valve so that the piston remains in its previous position also when the compressed air has been cut off (that is in the chucking position).

During chucking or unchucking at one work chine the said arrangement cannot result in the pressure being reduced in the piping or in the compressed-air cylinders of the other closed chucks not even, if the several operations take considerable time.

Such an arrangement supplied by a third pipe and preventing the reduction of the chucking power, as otherwise rendered possible by accidental leakages in the piping etc., has not yet been made use of in the automatics or semi-automatics hitherto known.

The accompanying drawings diagrammatically show an embodiment of the invention and represents in—

Fig. 1 a vertical longitudinal section through an embodiment of a central pneumatic control device applied to a four-spindle metal working machine, only the controlling cylinders for the chucks and the rear portions of the latter being shown.

Fig. 2 shows a front elevation of a part of the compressed-air piping with a part of the control devices for the compressed air.

Fig. 6 shows a partial view of Fig. 1 and represents on a larger scale a vertical longitudinal section of the central pneumatic control.

Similar numerals refer to similar parts throughout the several views.

In the following there will at first be described the central pneumatic control proper and subsequently the system of supplying the compressed air and the several members required for this purpose.

Figure 5:
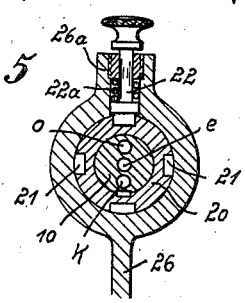
Fig. 5 shows a section on line E—F of Fig. 1 and represents the control device intended for controlling the admission of air in any operating position of one of the work spindles.

The central controlling device intended for the several work spindles of a multiple-spindle machine tool mainly comprises a compressed-air distributor composed of two parts 12 and 16 suitably connected. By screw bolts 16a this compressed-air distributor is fastened to a large disc 12a keyed to the carrier stem 28 of the spindle carrier so that the members 12, 16, and 12a are adapted to revolve altogether. By means of the disc 12a the compressed-air distributor is revolubly mounted in a ring 15a of a frame 15. The central controlling device further comprises a locking or indexing sleeve 20 revolubly mounted in a projection 26a of the arm 26 of the frame 15 and which is provided with as many locking grooves as there are work spindles in the spindle carrier of the machine tool (see Fig. 5). The said sleeve 20 is held in its position by a locking pin 22. The said locking pin 22 is mounted in the projection 26a of the arm 26 and is pressed into the locking grooves 21 of the sleeve 20 by a spring 22a. A screw bolt 19a secures a hand wheel 19 to the sleeve 20. The said sleeve 20 is further fastened to a shaft 10 provided with several compressed-air ducts $o$, $e$, and $k$ the purpose of which will be explained later on. In the following description this shaft will be termed compressed-air supply shaft. This compressed-air supply shaft is revolubly mounted in a distributor bracket 7 fastened to the arm 26, and in the part 12 of the compressed-air distributor. At its left-hand end it is provided with a thread 10a upon which is screwed a fastening nut 10b bearing against the abutment 7a of the distributor bracket 7. The other end of the compressed-air supply shaft 10 carries a distributing disc 11 secured thereto and which is provided with several ducts $b$, $f$, and $m$. The duct $b$ communicates with the compressed-air duct $o$ and the duct $f$ with the compressed-air duct $e$. The ducts $b$ and $f$ can selectively be connected with several ducts $c^1$—$c^4$ and $g^1$—$g^4$ respectively in the part 12 of the compressed-air distributor. The arrangement of the conduits or ducts $b$ and $f$ opposite the three ducts $c$ and $g$ for indexing the chucks, as well as the arrangement of the holes $m$ opposite the fourth duct $g^3$ takes place at the ground plan faces of the distributing disc 11 and the member 12 of the distributing member 12—16, whereby by the super-pressure constantly existing in the hollow space $l$ and the pressure on the disc-shaped plate 23 caused by the spring 24 a good and secure tightness between the two plan faces is obtained. The ducts $c^1$—$c^4$ communicate with compressed-air conduits $d^1$—$d^4$ each connected to one of the distributing casings of each work spindle while the ducts $g^1$—$g^4$ communicate through the conduits $h^1$—$h^4$ disposed in the part 16 of the compressed-air distributor, with conduits $i^1$—$i^4$ also connected to the distributing casings of the cylinders of the several work spindles.

The compressed air duct $k$ arranged in the compressed-air supply shaft 10 extends as far as the right-hand end thereof and ends in a hollow space $l$ of the part 16 of the compressed-air distributor. Thus compressed air is, while the machine is working, supplied to the space $l$ so as to result in an equilibrium of the pressures prevailing respectively in the indexible distributing disc 11 and the part 12 of the compressed-air distributor, and in the distributing disc 11 being prevented from being pressed off by the compressed-air ducts $b$ and $c^1$—$c^4$ or $f$ and $g^1$—$g^4$ respectively in the body of the distributor.

The several ducts $m$ provided in and passing through the distributing disc 11 are adapted to establish a communication between the pressure hollow space $l$ and several of the compressed-air cylinders through the intermediary of the other ducts, for instance $g^2$—$g^4$, and the conduits, for instance $i^2$—$i^4$, and thus to ensure a permanent reliable chucking effect of the clamping jaws on the work. The left-hand face of the distributing disc 11 is provided with a groove $n$ intended for connecting the several ducts $m$ with one another (see Fig. 4 right-hand portion). So the compressed-air escaping in the event by leakage from hollow space $l$ is therefore continually made up through the ducts $m$ and the connecting groove $n$, which in the position shown in the drawings communicates with the ducts $g^2$—$g^4$.

From a source of compressed fluid (not shown) a compressed-air pipe 1 is connected through a branch piece 1a to an inlet cock 2. This inlet cock 2 is in turn connected to a branch piece 2a from which a pipe leads to a pressure gauge 2b while the second branch pipe leads to a control valve 3 and the third branch to a compressed-air supply pipe 25. The control valve 3 is provided with a handle 4 adapted to be brought into a right-hand and a left-hand position. To the control valve there are connected the pipes 5 and 6 which together with the compressed-air supply pipe 25 end in supply ducts 8, 9 and 25a of the distributor bracket 7. These supply ducts 8, 9 and 25a communicate with hollow spaces 7b, 7c, 7d of the distributor bracket 7, which hollow spaces in turn communicate with the ducts $o$, $e$, and $k$ respectively provided for in the compressed-air supply shaft 10.

Figure 3:
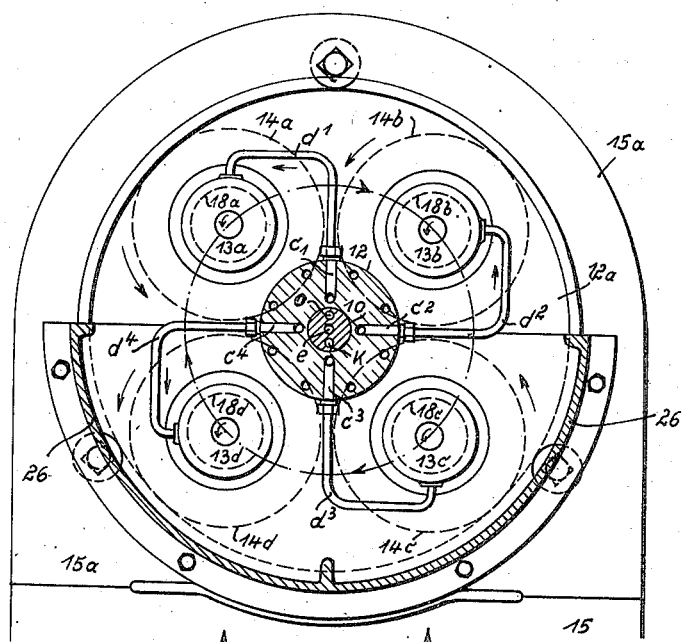
Fig. 3 shows a section on line A—B of Fig. 1 and also a front elevation of the compressed-air cylinders of the several chucks.

The compressed-air conduits $d^1$—$d^4$ and $i^1$—$i^4$ above referred to end each (see Figs. 1 and 3) in one of the distributing casings 13a—13d of the several compressed-air cylinders 14a—14d. Each of these compressed-air cylinders 14a—14d is provided with two pistons 17 and 17a carried by a work spindle 18a—18d. As the construction of the work spindles of the cylinders with their pistons and of the distributing cases is absolutely identical in each instance, only one set comprising the work spindle 18a, the cylinder 14a and the distributing case 13a will be described here.

As Fig. 1 shows, the embodiment represented comprises two pistons 17 and 17a fastened to a rod 27a of the work spindle 18a, which pistons are slidable in a cylinder space 29 and 29a respectively of the double cylinder 14a. From the distributing case 13a a conduit 30 leads to the cylinders 29 and 29a respectively on the left-hand sides of the pistons 17 and 17a respectively. From the said distributing case a conduit 31 further leads to the cylinders 29 and 29a respectively on the right-hand sides of the pistons 17 and 17a respectively.

The work spindles together with their compressed-air cylinders and the distributing cases with the conduits connected thereto the same as the parts 12 and 16 are indexed at the same time as the stem 28 of the spindle carrier so that each work spindle (four of them in the embodiment shown) can, together with the work fastened to them, be moved into the various operating positions.

The operation of the device is as follows:— Through the compressed-air supply pipe 1 and the inlet cock 2 the compressed-air is supplied to the control valve 3. The handle 4 being brought into its left-hand or right-hand position the compressed-air will be supplied either to the pipe 5 or to the pipe 6 and subsequently to the ducts 8 or 9 of the distributing bracket 7. The compressed-air is conducted through the ducts $o$ and $e$ of the compressed-air supply shaft 10 to the distributing disc 11 and from there, according to the position of the handle 4 of the control valve 3 either through duct $b$, the ducts $c^1$—$c^4$ and the conduits $d^1$—$d^4$ to one of the distributing cases 13a—13d, or through duct $f$, ducts $g^1$, $h^1$—$g^4$, $h^4$ and the conduits $i^1$—$i^4$ to the distributing cases 13a—13d.

Figure 4:
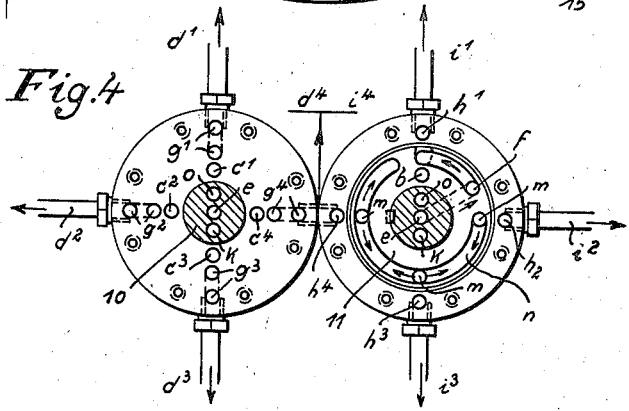
Fig. 4 shows a section on line C—D of Fig. 1, the surfaces of the pressure distributor as lying on this line being represented as turned down.

In the positions shown in Figs. 1, 4, and 6 the compressed-air to be conducted to the compressed-air cylinder 14a of the collet or chuck to be opened flows from duct $b$ of the distributing disc 11 into the duct $c^1$ of the distributor body 12 and from here through the conduit $d^1$ into the distributing case 13a of the compressed-air cylinder which in the position shown opens the chuck concerned.

When the collet or chuck is to be closed, the handle 4 (Fig. 2) is brought into its left-hand position so that the compressed-air flows through the pipe 6, the duct 9, the space 7c, the duct $e$ of the compressed-air supply shaft 10 and the duct $f$ of the distributing disc 11 into the duct $g^1$ of the body 12 and further through the duct $h^1$ of the part 16 through conduit $i^1$ into the distributing case 13a and subsequently through the conduit 31 into the cylinders 29 and 29a towards the right-hand side of the pistons 17 and 17a respectively. In this way the rod 27a is caused to move to the left so as to close the clamping jaws of the chuck.

When the work is to be clamped in another working position of the work spindle, e. g. 18d, the sleeve 20, having as many locking grooves 21 as there are work spindles 18 in the spindle carrier of the machine tool, is turned or indexed correspondingly by means of the hand wheel 19 (in this instance through an angle of 90 degrees) and secured in the position desired, by means of the locking pin 22. By the angular displacement of the sleeve 20 also the compressed-air supply shaft 10 and thus the distributing disc 11 are turned until the ducts $b$ and $f$ have been brought into register with two other ducts, viz. $c^4$ and $g^4$ of the distributor body 12 (see Fig. 4). Thereupon it will be possible, by moving the handle 4, to close and open the chuck as desired in this position of the compressed-air supply shaft 10 and of the distributing disc 11.

Meanwhile the other collets or chucks are kept closed since the compressed-air is allowed to flow from the duct $b$ or $f$ solely into one of the ducts $c^1$—$c^4$ or $g^1$—$g^4$ of the body 12. As is obvious from Figs. 1 to 4, the other ducts, which are not connected with the ducts $b$ and $f$ are closed at X against the feeding ducts of the distributing disc 11.

When the device is indexed by the stem 28 of the spindle carrier being actuated, the position of the distributing disc 11 is not changed but in any case another duct $c^1$—$c^4$ and $g^1$—$g^4$ respectively is connected with the ducts $b$ and $f$ respectively so that, in spite of the indexing movement referred to, the position in which the chuck is opened and closed remains unchanged unless the position of the compressed-air supply shaft 10 and of the distributing disc 11 is changed in order that another position is used for clamping or releasing the work.

The third compressed-air supply pipe 25 branched keeps the space $l$ through the duct $k$ continually under pressure. The pressure fluid gets through the holes or ducts $m$ and the connecting groove $n$ of the distributing disc to the ducts at that time not connected with the duct $f$, such as $g^2$—$g^4$ of the distributor 12, and further through the conduits, e. g. $i^2$—$i^4$, into the space behind the pistons, such as 17 and 17a, of the several compressed-air cylinders, such as 14a—14b, so as to always act under constant pressure on the chucks closed.

By the plan faces smoothly ground in accordance with one another between the distributing disc 11 and the inner plan face of the distributing members 12—16 and by the constant pressure of the spring 24 as well as by the super-pressure in the hollow space $l$ against the right plan faces of the disc-shaped plate 23 and the distributing disc 11 a secure tightness between the plan faces of the disc 11 and the distributing member 12 is ensured, so that a direct communication of the inner super-pressure with the atmosphere cannot occur.

According to the invention the compressed-air supply shaft 10 and the compressed-air distributors 11, 12, and 16 are in alignment with the carrier stem 28 of the spindle carrier and centrical relatively to the compressed-air cylinders 14a—14d fastened to the work spindles 18a—18d.

What I claim is:—

1. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means which control device comprises two discs rotatable relatively to each other and being provided with ducts for the pressure fluid and independently indexible means co-operating with said single control device and pressure fluid operating means for controlling the operation of the chucks in any operative position of the spindles, said single control device being in direct communication with a single fluid pressure supply source for opening and closing the chucks and also maintaining them closed.

2. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means which control device comprises two discs rotatable relatively to each other and being provided with ducts for supplying the pressure fluid to the said rotatable parts and with ducts for removing the pressure fluid from the said parts and independently indexible means co-operating with said single control device and pressure fluid operating means for controlling the operation of the chucks in any operative position of the spindles, said single control device being in direct communication with a single fluid pressure supply source for opening and closing the chucks and also maintaining them closed.

3. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members, means for indexing the said shaft and a locking member for locking the said shaft in a plurality of positions.

4. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with a sleeve, a locking member for locking the said sleeve in a plurality of positions.

5. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with a sleeve, the said sleeve being provided with a plurality of locking grooves, a locking member adapted to engage with each of the said locking grooves.

6. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and carrying a hand wheel, the said shaft being provided with a sleeve having a plurality of locking grooves, a locking member adapted to engage with each of the said locking grooves.

7. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with a sleeve, the said sleeve being provided with a plurality of locking grooves, a locking member adapted to engage with each of the said locking grooves and pressure fluid ducts arranged within the said shaft.

8. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with pressure fluid ducts, conduits leading from the said members to distributing cases of the pressure fluid means.

9. In a metal working machine, the combination of a rotary spindle carrier, a plurality of rotary work spindles carried thereby, a chuck for each work spindle, pressure fluid operated means for operating the said chucks and a single centrally arranged control device for the said pressure fluid operated means which control device comprises two discs rotatable relatively to each other and being provided with ducts for the pressure fluid, means adapted to closely press the said two members against each other.

10. In a metal working machine, the combination of a rotary spindle carrier, a plurality of rotary work spindles carried thereby, a chuck for each work spindle, pressure fluid operated means for operating the said chucks and a single centrally arranged control device for the said pressure fluid operated means which control device comprises two discs rotatable relatively to each other and being provided with ducts for the pressure fluid, means adapted to closely press the said two members against each other and including a spring.

11. In a metal working machine, the combination of a rotary spindle carrier, a plurality of rotary work spindles carried thereby, a chuck for each work spindle, pressure fluid operated means for operating the said chucks and a single centrally arranged control device for the said pressure fluid operated means which control device comprises two members rotatable relatively to each other and being provided with ducts for the pressure fluid, means adapted to closely press said two members against each other, a chamber arranged behind one of said members and closed against the outer atmosphere and filled with the pressure fluid.

12. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with pressure fluid ducts, conduits leading from the said members to distributing cases of the pressure fluid means, one of the said pressure fluid ducts of the shaft leading to a chamber closed against the outer atmosphere.

13. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with pressure fluid ducts, conduits leading from the members angularly rotatable relatively to each other, means adapted to conduct the pressure fluid to a part of the pressure fluid operated means.

14. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with pressure fluid ducts, conduits leading from the said members to distributing cases of the pressure fluid means, a plurality of cylinders, a piston arranged in each of the said cylinders and connected with a work spindle.

15. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two members rotatable relatively to each other and provided with ducts for the pressure fluid, a shaft secured to one of said members and provided with pressure fluid ducts, conduits leading from the said members to distributing cases of the pressure fluid means, a plurality of cylinders each of which including two cylinder spaces, two pistons in each cylinder and connected with a work spindle, conduits leading from the distributing cases to the said cylinder spaces.

16. In a metal working machine, the combination of an indexible rotary spindle carrier having rotary work spindles provided with fluid operated chucks and a single control device comprising a plurality of members, some indexible with the chucks and the others non-rotatable to operate the chucks in their loading positions and rotatable to permit the operation of the chucks in their non-loading position, and means for maintaining airtight connection between said members.

17. In a metal working machine, the combination of an indexible rotary spindle carrier having rotary work spindles provided with fluid operated chucks and a single central control device comprising a plurality of members, some indexible with the chucks and the others non-rotatable to operate the chucks in their loading positions and rotatable to permit the operation of the chucks in their non-loading position, and means maintaining airtight connection between said members.

18. In a metal working machine, the combination of an indexible rotary spindle carrier having rotary work spindles provided with fluid operated chucks and a single control device comprising a pair of disks having ducts therein rotatable relative to each other for operating the chucks in their loading position and means in engagement with one of said disks for holding the disks in airtight engagement with each other.

19. In a metal working machine, the combination of an indexible rotary spindle carrier having rotary work spindles provided with fluid operated chucks and a single control device comprising a pair of disks having ducts therein rotatable relative to each other for operating the chucks in their loading position and a shaft secured to one of said discs and having ducts extending longitudinally therethrough communicating with the ducts in said disks.

20. In a metal working machine, the combination of an indexible rotary spindle carrier having rotary work spindles provided with fluid operated chucks and a single control device comprising a pair of disks having ducts therein rotatable relative to each other for operating the chucks in their loading position, a shaft secured to one of said disks and having ducts extending longitudinally therethrough communicating with the ducts in said disks and means for rotating said shaft and disk to permit operation of the chucks in their non-loading position.

21. In a metal working machine, the combination of an indexible rotary spindle carrier having rotary work spindles provided with fluid operated chucks and a single control device comprising a pair of disks having ducts therein rotatable relative to each other for operating the chucks in their loading position, a shaft secured to one of said disks and having ducts extending longitudinally therethrough communicating with the ducts in said disks, means for rotating said shaft and disk to permit operation of the chucks in their non-loading position and valve means independent of the single control device for controlling the fluid thereby to operate the chucks.

22. In a metal working machine, the combination of an indexible rotary spindle carrier having rotary work spindles provided with fluid operated chucks and a single control device comprising a pair of disks having ducts therein, one rotatable relative to the other for operating the chucks in their loading position, and the second rotatable with or independently of the first to permit operation of the chucks in any of their non-loading positions.

23. In a metal working machine, the combination of an indexible rotary spindle carrier having rotary work spindles provided with fluid operated chucks and a single control device comprising a pair of disks having ducts therein, one rotatable relative to the other for operating the chucks in their loading position, the second rotatable with or independently of the first to permit operation of the chucks in any of their non-loading positions and means for maintaining airtight connection between both of said disks.

24. In a metal working machine, the combination of a rotary spindle carrier, a plurality of rotary work spindles carried thereby, a chuck for each work spindle, pressure fluid operated means for operating the said chucks, a single control device for the plurality of pressure fluid operated means, and means for independently indexing said single control device for controlling the operation of the chucks in any operative position of the spindles, said single control device being in position upon each indexing thereof to operate one of said chucks.

25. In a metal working machine, the combination of a rotary spindle carrier, a plurality of rotary work spindles carried thereby, a chuck for each work spindle, pressure fluid operated means for operating the said chucks, a single centrally arranged control device for the plurality of the pressure fluid operated means, and means for independently indexing said single control device for controlling the operation of the chucks in any operative position of the spindles, said single control device being in position upon each indexing thereof to operate one of said chucks.

26. In a metal working machine, the combination of a rotary spindle carrier, a plurality of rotary work spindles carried thereby, a chuck for each work spindle, pressure fluid operated means for operating the said chucks, a single control device for the plurality of the pressure fluid operated means arranged between the said pressure fluid operated means, and means for independently indexing said single control device for controlling the operation of the chucks in any operative position of the spindles, said single control device being in position upon each indexing thereof to operate one of said chucks.

27. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising several parts movable relatively to each other, and means for independently indexing said single control device for controlling the operation of the chucks in any operative position of the spindles, said single control device being in position upon each indexing thereof to operate one of said chucks.

28. In a metal working machine, the combination of a rotary spindle carrier, a plurality of rotary work spindles carried thereby, a chuck for each work spindle, pressure fluid operated means for operating the said chucks, a single centrally arranged control device for the said pressure fluid operated means and comprising two parts rotatable relatively to each other, and means for independently indexing said single control device for controlling the operation of the chucks in any operative position of the spindles, said single control device being in position upon each indexing thereof to operate one of said chucks.

RUDOLF ECKARDT.

CERTIFICATE OF CORRECTION.

Patent No. 2,103,351. December 28, 1937.

RUDOLF ECKARDT.

It is hereby certified that error appears in the printed specification of the above numbered patent requiring correction as follows: Page 1, first column, line 60, after "work" insert the words and syllable --spindle or during a longer stoppage of the ma- --; and that the said Letters Patent should be read with this correction therein that the same may conform to the record of the case in the Patent Office.

Signed and sealed this 15th day of April, A. D. 1941.

Henry Van Arsdale,
Acting Commissioner of Patents.

(Seal)